United States Patent [19]

Ohya et al.

[11] 4,338,385
[45] Jul. 6, 1982

[54] DIVALENT SILVER OXIDE CELL CONTAINING CADMIUM AND TELLURIUM COMPONENTS

[75] Inventors: Yoichi Ohya, Funabashi; Tadayoshi Shimizu, Tokyo, both of Japan

[73] Assignee: Sumitomo Metal Mining Company, Ltd., Tokyo, Japan

[21] Appl. No.: 271,088

[22] Filed: Jun. 5, 1981

[30] Foreign Application Priority Data

Jun. 23, 1980 [JP] Japan ................................. 55-83974
Jul. 22, 1980 [JP] Japan ................................. 55-99418
Oct. 9, 1980 [JP] Japan ................................. 55-140400
Dec. 25, 1980 [JP] Japan ................................. 55-182846
Feb. 6, 1981 [JP] Japan ................................. 56-15665
Feb. 6, 1981 [JP] Japan ................................. 56-15666

[51] Int. Cl.$^3$ ............................................. H01M 6/04
[52] U.S. Cl. .................................... 429/206; 429/219
[58] Field of Search ..................... 429/219, 206, 207

[56] References Cited

U.S. PATENT DOCUMENTS

3,650,832 3/1972 Tvarusko ........................ 429/219 X
4,078,127 3/1978 Megahed ........................ 429/219 X
4,292,383 9/1981 DiPalma et al. .................... 429/219

Primary Examiner—Charles F. LeFevour
Attorney, Agent, or Firm—Watson, Cole, Grindle & Watson

[57] ABSTRACT

A divalent silver oxide cell of the type having a positive electrode formed mainly of divalent silver oxide has its stability greatly improved by adding a cadmium component and a tellurium component and, optionally, at least one auxiliary component containing an element selected from the group consisting of thallium, mercury, lead, germanium, yttrium, tin, tungsten, lanthanum, rare earth elements, zinc, aluminum and selenium, each to either the divalent silver oxide, the alkaline electrolyte, or both. The cadmium component is contained in a concentration of not less than 0.03% by weight when in the divalent silver oxide and not less than 0.01 g/liter when in the alkaline electrolyte; and tellurium component in a concentration of not less than 0.01% by weight when in the divalent silver oxide and not less than 0.01 g/liter when in the alkaline electrolyte; and the at least one auxiliary component in a total concentration of not less than 0.01% by weight when in the divalent silver oxide and not less than 0.01 g/liter when in the alkaline electrolyte.

39 Claims, 1 Drawing Figure

DIVALENT SILVER OXIDE CELL CONTAINING CADMIUM AND TELLURIUM COMPONENTS

BACKGROUND OF THE INVENTION

1. Field of the Invention

This invention relates to the improvement of divalent silver oxide cells that utilize divalent silver oxide as the main component of the positive electrode.

2. Description of the Prior Art

Conventional alkaline silver batteries are known in which the positive electrode of the alkaline cells are formed mainly of divalent silver oxide and the negative electrode are mainly formed of zinc or another similar substance. The divalent silver oxide has a large oxygen content as compared with mono valent silver oxide, and thus a cell using divalent silver oxide displays a high discharge capacity. However, since divalent silver oxide displays a poor stability in the cell and will gradually decompose into mono valent silver oxide, during storage of the battery system the oxygen which is evolved within the cell will increase the inner pressure within the cell so much that the cell will deform, or in extreme cases break open. This decomposition of the divalent silver oxide (otherwise called "self-discharge") also means that the amount of divalent silver oxide available for the operation of the cell will decrease, making it impossible for the cell to generate the amount of electrical current originally intended. Particularly in alkaline cells intended for long duration service, this phenomenon of self-discharge poses an important problem.

It is believed that the tendency of the divalent silver oxide in the divalent silver oxide cell to decompose is ascribable to the high activity of the divalent silver oxide and to the consequent reaction of the divalent silver oxide with the alkaline electrolyte with which it is held in direct contact. One method of avoiding this drawback, wherein the surfaces of the divalent silver oxide particles are covered with silver plumbate, is disclosed in U.S. Pat. No. 3,017,448. This method has resulted in an improved storage life for a divalent silver oxide cell.

As a criterion of the stability of divalent silver oxide for use in cells, the value called "gassing rate" or "rate of oxygen evolution" can be used. This criterion is expressed by the volume of oxygen evolved during a fixed length of time by 1 g of divalent silver oxide kept in an aqueous 40% sodium hydroxide or potassium hydroxide solution at 40° C. It should be noted that these conditions are harsher than those under which a divalent silver oxide cell is normally operated.

A divalent silver oxide cell normally uses sodium hydroxide as the electrolyte. For applications which need a large electric current at once, however, these cells require the use of potassium hydroxide as the electrolyte. The conventional divalent silver oxide generally exhibits less stability in the presence of potassium hydroxide than in the presence of sodium hydroxide.

The present inventors, in looking for ways for stabilizing a divalent silver oxide cell having divalent silver oxide in the positive electrode, experimented with the incorporation of various additives to the cell. One discovery was that the addition of a lead source and an aluminum source to either the divalent silver oxide electrode or to the alkaline electrolyte in the divalent silver oxide cell served to give a high stability to the divalent silver oxide. This discovery has been described in detail in Japanese citations JA-OS No. 9222/1981 and JA-OS No. 9966/1981.

An object of this invention is to provide a divalent silver oxide cell having a positive electrode formed mainly of divalent silver oxide wherein the divalent silver oxide will be characterized by a notably improved stability.

SUMMARY OF THE INVENTION

As a result of further study, the inventors have found that when two components of cadmium and tellurium are added to the divalent silver oxide, to the alkaline electrolyte or to both, the stability of a divalent silver oxide is notably enhanced and the enhanced stability is not impaired even when potassium hydroxide is used as the electrolyte for the cell.

The inventors have also discovered that a divalent silver oxide which contain a cadmium component and a tellurium component can be even further improved in stability by effecting the addition of the cadmium component and the tellurium component in conjunction with the addition of one or more auxiliary components which contain elements selected from the group consisting of thallium, mercury, lead, germanium, yttrium, tin, tungsten, lanthanum, rare earth elements, zinc, aluminum and selenium. Such auxiliary components may be incorporated in the divalent silver oxide, in the alkaline electrolyte or both.

DETAILED DESCRIPTION OF THE INVENTION

Of the additive components used in this invention, some are readily soluble in the alkaline electrolyte whereas others are only slightly soluble. In any event, the stabilization of the divalent silver oxide cell according to the present invention is accomplished by adding the noted components in the required amounts to the divalent silver oxide making up the positive electrode, to the alkaline electrolyte, or to both. Since cadmium, thallium, mercury, tin and yttrium are only slightly soluble in alkaline electrolyte, they are incorporated in the alkaline electrolyte in the form of a slurry or in a suspended state. On the other hand, since tellurium, lead, germanium, aluminum, zinc and selenium are readily soluble in alkaline electrolyte, they dissolve in the form of ions when incorporated in the electrolyte. However, even in the case of a component which is slightly soluble in the alkaline electrolyte, since only a small amount of the component will be needed, the very small amount of the component dissolved in the electrolyte will nevertheless play a significant role in the stabilization of the divalent silver oxide. This means that the addition of such a component to the alkaline electrolyte, even though slightly soluble in alkalis, proves to be amply effective in stabilizing the divalent silver oxide.

When the addition of the component is made to the divalent silver oxide, the divalent silver oxide will desirably be of a type produced, as is generally practiced, by using a silver nitrate solution, an oxidizing agent such as potassium persulfate and a caustic alkali. A nearly similar effect is attained, however, by using a divalent silver oxide of the type produced by the silver halide oxidation method or the ozone oxidation method.

Inclusion of the cadmium component and the tellurium component and/or the auxiliary component such as thallium or yttrium in the divalent silver oxide is advantageously effected by causing the reaction of an alkali hydroxide, silver nitrate and an oxidizing agent, adding the cadmium component, the tellurium component and the auxiliary component to the produced divalent silver oxide in the resultant slurry (not yet filtered or dried), mixing them, and then subjecting the resultant mixture to filtration and drying. Alternatively, it may be accomplished by preparatorily drying divalent silver oxide, redispersing the dried divalent silver oxide in a dispersion medium and adding the cadmium component, the tellurium component and the auxiliary component to the resultant dispersion. Otherwise, it may be attained by mechanically mixing divalent silver oxide in its dry state with the cadmium component, the tellurium component and auxiliary component. It is also possible to effect this inclusion by adding the cadmium component, the tellurium component and the auxiliary component to a silver nitrate solution, an alkali solution, an oxidizing agent and water as the medium which is being treated for the manufacture of divalent silver oxide.

The inclusion is as effectively obtained as described above by adding the cadmium, tellurium and auxiliary components to the granules of divalent silver oxide produced during the manufacture of the positive electrode of divalent silver oxide for the cell and subsequently pressing the resultant mixture in the shape of a positive electrode.

When the components to be added to the divalent silver oxide cell are limited to cadmium and tellurium, the amount of the cadmium component must be not less than 0.03% by weight calculated as cadmium metal and that of the tellurium component not less than 0.01% by weight calculated as tellurium metal, respectively. Even when the present invention is carried out by using amounts of the additive components at their respective lower limits, the improvement in stability of the cell is remarkable as compared with the improvement brought about by the conventional technique resorting to the sole use of a cadmium component. To obtain the same degree of stability in the cell by sole use of cadmium, the amount of cadmium to be added must by at least 0.3% by weight. This fact is presumed to indicate clearly that the addition of the components contemplated by this invention has a multiple effect in the improvement of cell stability. Naturally, the volume of oxygen evolved within the cell is decreased more effectively with the combined use of cadmium and tellurim. The effect brought about by the combined use is not fully conspicuous, however, when the two components are incorporated in concentrations falling below their respective lower limits as identified above.

When the cadmium component and the tellurium component are added to the divalent silver oxide, the ratio of the amount of cadmium to that of tellurium desirably exceeds 0.2, preferably 0.5. An excessive increase in the amount of tellurium relative to that of cadmium is undesirable because it impairs rather than improves the desired effects.

The total of cadmium and tellurium to be added to the divalent silver oxide is desirably kept below an upper limit of about 10% by weight. Excess use of these components lowers the purity of the divalent silver oxide and consequently results in a reduction in the amount of electric current generated. When these components are used as extenders or fillers for the divalent silver oxide when pressing the positive electrode of the cell, however, they may be added in amounts totalling more than 10% by weight. In this case, the components added in excess do not degrade the stability of divalent silver oxide.

Examples of the cadmium component advantageously usable in this invention include cadmium oxide, cadmium hydroxide, powdered cadmium metal, cadmium sulfide, cadmium sulfate, cadmium nitrate, cadmium stearate, cadmium formate, cadmium selenide and cadmium selenate. These cadmium components can be used either singly or in varying combinations. Examples of the tellurium component usable advantageously in this invention include tellurium dioxide, tellurium trioxide, powdered tellurium metal, telluric acid, tellurous acid, alkali salts of telluric acid, alkali salts of tellurous acid and tellurates. These tellurium components can be used either singly or in varying combinations. The compounds and alloys which contain both cadmium and tellurium such as, for example, $CdTeO_3$, $CdTeO_4$ and powdered Cd-Te alloy can also be used for the purpose of addition.

When the cadmium and tellurium components are added to the alkaline electrolyte in the divalent silver oxide cell, the amount of the cadmium component so added desirably exceeds 0.03 g/liter, although the effect of the addition of this component becomes discernible as the amount added rises above 0.01 g/liter. An increase of this amount beyond 10 g/liter, however, cannot be expected to bring about any additional effect. The effect of the addition of the tellurium component becomes discernible as the amount of the component added rises above 0.01 g/liter. For the effect of the addition to be amply, the tellurium component is desirably added in an amount of not less than 0.02 g/liter, preferably 0.04 g/liter. When the concentration of the tellurium component thus added increases to an excess, the effect of the addition of this component is noted to decline. The amount of the component, therefore, is required to be kept below 5.0 g/liter.

Optionally, one of the cadmium and tellurium components may be added to the divalent silver oxide and the other to the alkaline electrolyte. On the other hand, one of the two components may be added to either the divalent silver oxide or the alkaline electrolyte and the other partly to the divalent silver oxide and partly to the alkaline electrolyte. It is also permissible that the two components be added partly to the divalent silver oxide and partly to the alkaline electrolyte.

When one of the cadmium and tellurium components is added only to the divalent silver oxide and the other only to the alkaline electrolyte, the lower limits to the amounts of these components thus added are equal to the lower limits to the amounts of the components when they are added to only the divalent silver oxide or the alkaline electrolyte. When the cadmium component is added partly to the divalent silver oxide and partly to the alkaline electrolyte, the amount of this component incorporated in the divalent silver oxide has to exceed 0.01% by weight and that in the alkaline electrode has to exceed 0.02 g/liter.

When the cadmium component, the tellurium component and the auxiliary component are incorporated only in the divalent silver oxide, the amount of the cadmium component must exceed 0.03% by wight as cadmium metal, that of the tellurium component must exceed 0.01% by weight as tellurium metal and that of the auxiliary component must exceed 0.01% by weight, respectively. Addition of the auxiliary component such as thallium notably contributes to the improvement of the stability of the divalent silver oxide cell.

The upper limit to the total amount of cadmium, tellurium and auxiliary components added to divalent silver oxide is desirably limited to the neighborhood of 10% by weight. When the total exceeds this upper limit, the added components lower the purity of the divalent silver oxide and consequently decrease the amount of electric current which can be generated from the cell. If auxiliary components such as thallium are added in excess of their upper limits of 3% by weight each, their excess amounts are not found to bring about any additional effects. However, when such auxiliary components are used as extenders in the pressing of the positive electrode of the cell, the total amount of cadmium, tellurium and auxiliary components may exceed 10% by weight similarly to the use of the cadmium and tellurium components as extenders. In this case, an increase in the total beyond the upper limit of 10% by weight does not tend to impair the stability of the divalent silver oxide.

Similarly to the cadmium component and the tellurium component, the auxiliary components such as thallium, lead germanium, mercury, yttrium, tin, tungsten, lanthanum and rare earth elements may be used in the form of oxides, metals, salts and intermetallic compounds.

When the cadmium, tellurium and auxiliary components are added to the alkaline electrolyte, their effects begin to appear as the amounts of cadmium and tellurium exceed 0.01 g/liter each and the total of the amount of auxiliary components exceeds 0.01 g/liter. The effects of these components are not expected to increase discernibly if the total of their amount exceeds 10 g/liter.

When cadmium components and, thallium, thin, yttrium, and other auxiliary components which are slightly soluble in alkalis are added to the electrolyte, the particle sizes of these substances are desirably not larger than 60 mesh.

Optionally, the cadmium and tellurium components and the auxiliary components such as thallium may be added partly to the divalent silver oxide and partly to the alkaline electrolyte.

DESCRIPTION OF THE DRAWING

The attached FIGURE shows a schematic figure of an apparatus which can be used for determining the stability of a divalent silver oxide cell. In the working examples cited herein below, the device of the FIGURE was used for measuring the gassing rate from the divalent silver oxide cell, the device including a graduated glass tube 1, an alkaline electrolyte 2, a 1-gram sample of divalent silver oxide 3, a constant temperature bath 4 and hot water 5 at 40° C.

EXAMPLE 1

Figure 1:
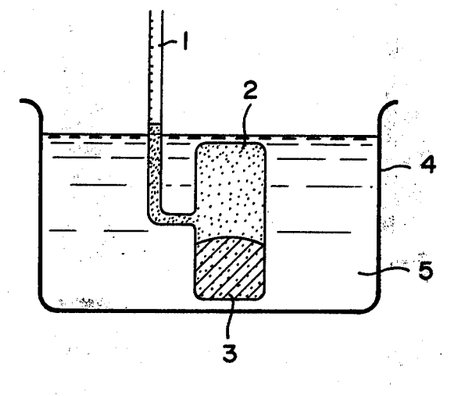

In 1000 ml of deionized water, 100 g of dry divalent silver oxide synthesized from silver nitrate and potassium persulfate in an alkali solution was dispersed by stirring. In the resultant dispersion, cadmium oxide as a cadmium source and tellurium dioxide as a tellurium source were added in varying amounts indicated in Table 1 and stirred for 10 minutes. The mixture obtained was then filtered and dried. Separately, in an aqueous 40% (weight) potassium hydroxide solution as an electrolyte for a cell, cadmium oxide as a cadmium source and tellurium dioxide as a tellurium source were added in the varying amounts indicated in Table 1 and were thoroughly dispersed or dissolved. In the resultant solution, the aforementioned divalent silver oxide was allowed to stand at 40° C. for 240 hours. The volume of the gas evolved during this standing was measured to determine the extent of oxygen evolution. The results are as shown in Table 1.

TABLE 1

| Run No. | Content in divalent silver oxide (% by weight) | | Content in potassium hydroxide (g/liter) | | Gassing rate (μl/g.240 hour) |
|---|---|---|---|---|---|
| | Cd | Te | Cd | Te | |
| 1 | — | — | — | — | 627 |
| 2 | — | 0.30 | — | — | 950 |
| 3 | 0.50 | — | — | — | 264 |
| 4 | 0.01 | 0.005 | — | — | 291 |
| 5 | 0.03 | 0.01 | — | — | 205 |
| 6 | 0.10 | 0.10 | — | — | 98 |
| 7 | 0.03 | 0.10 | — | — | 65 |
| 8 | 0.60 | 0.29 | — | — | 54 |
| 9 | 2.50 | 2.47 | — | — | 48 |
| 10 | 10.0 | 5.80 | — | — | 45 |
| 11 | 0.30 | — | — | 0.20 | 63 |
| 12 | — | — | 0.01 | 0.01 | 320 |
| 13 | — | — | 0.03 | 0.02 | 198 |
| 14 | — | — | 0.05 | 0.05 | 127 |
| 15 | — | — | 0.10 | 0.05 | 87 |
| 16 | — | — | 0.30 | 0.10 | 67 |
| 17 | — | — | 1.0 | 0.50 | 58 |
| 18 | — | — | 3.0 | 1.0 | 50 |
| 19 | — | — | 9.5 | 1.5 | 46 |
| 20 | 0.20 | — | 0.50 | 0.20 | 60 |
| 21 | 0.20 | 0.10 | 0.50 | — | 56 |
| 22 | — | 0.05 | 0.50 | — | 73 |
| 23 | 0.01 | 0.01 | 0.02 | 0.02 | 171 |
| 24 | 0.03 | 0.01 | — | 0.02 | 154 |
| 25 | 0.30 | 0.10 | — | 0.10 | 58 |
| 26 | — | 0.10 | 0.30 | 0.10 | 63 |

Run Nos. 1–3 were comparative experiments in which cadmium and tellurium were not used in either the divalent silver oxide or the electrolyte. Run No. 4 incorporated both cadmium and tellurium in the divalent silver oxide in amounts falling below the lower limits specified by this invention, and therefore, failed to curb the gas evolution sufficiently. Run Nos. 5–26 were working examples of this invention and incorporated both cadmium and tellurium in the divalent silver oxide cell as specified. Run No. 5 which used cadmium and tellurium in amounts corresponding to their respective lower limits according to the invention of 0.03% and 0.01% exhibited better results than Run No. 3 which used cadmium in an amount of 0.50%. This contrast well demonstrates the high multiple effect of the addition of the two components, cadmium and tellurium. Run Nos. 6–10 were favorable working examples of this invention, with the volumes of gas evolved during the 240-hour standing invariably below 100 μl per gram. Among them, Run No. 10, which incorporated cadmium and tellurium both in amounts greater than necessary, showed results not discernibly improved over the results of Run No. 9. This fact clearly indicates that addition of the two elements in excess of the upper-limit total of 10% brings about no additional effect. Run No. 11 was a working example incorporating cadmium in the divalent silver oxide and tellurium in the electrolyte. Run Nos. 12–19 were working examples incorporating both cadmium and tellurium in the electrolyte. Run Nos. 20–26 were working examples incorporating cadmium and tellurium partly in the divalent silver oxide and partly in the electrolyte. All these examples exhibited qually favorable results.

EXAMPLE 2

In 1000 ml of deionized water, 100 g of dry divalent silver oxide synthesized in the same manner as indicated in Example 1 was dispersed by stirring. In the resultant dispersion, Cd(OH)$_2$ as a cadmium source, TeO$_2$ as a tellurium source, and PbO, Tl$_2$O$_3$, GeO$_2$ and HgO respectively as lead, thallium, germanium and mercury sources were added in the varying amounts indicated in Table 2 in the form of aqueous dispersions and were stirred for 10 minutes. The mixture obtained was then filtered and dried. The dried mixture thus obtained was tested for stability in an aqueous 40% (weight) potassium hydroxide solution. The volume of gas evolved during the mixture's 240 hours of standing in the solution was measured. The divalent silver oxide was assayed for content of the additive components. The results were as shown in Table 2.

TABLE 2

| Run No. | Content in divalent silver oxide (% by weight) | | | | | | Gassing rate ($\mu$l/g. 240 hours) |
|---|---|---|---|---|---|---|---|
| | Cd | Te | Pb | Tl | Ge | Hg | |
| 27 | — | — | 0.50 | — | — | — | 299 |
| 28 | — | — | — | 0.50 | — | — | 386 |
| 29 | — | — | — | — | 0.50 | — | 495 |
| 30 | — | — | — | — | — | 0.50 | 281 |
| 31 | 0.03 | 0.01 | 0.01 | — | — | — | 157 |
| 32 | 0.03 | 0.01 | — | 0.0 | — | — | 130 |
| 33 | 0.03 | 0.01 | — | — | 0.01 | — | 149 |
| 34 | 0.03 | 0.01 | — | — | — | 0.01 | 133 |
| 35 | 0.10 | 0.05 | 0.05 | — | — | — | 65 |
| 36 | 0.10 | 0.05 | — | 0.05 | — | — | 49 |
| 37 | 0.30 | 0.10 | 0.10 | — | — | — | 17 |
| 38 | 0.30 | 0.10 | — | 0.10 | — | — | 7 |
| 39 | 0.30 | 0.10 | — | — | 0.10 | — | 13 |
| 40 | 0.30 | 0.10 | — | — | — | 0.11 | 9 |
| 41 | 0.30 | 0.10 | 0.05 | 0.05 | — | — | 8 |
| 42 | 3.0 | 3.0 | — | 1.0 | — | — | 5 |
| 43 | 5.0 | 2.0 | 3.0 | — | — | — | 14 |
| 44 | 3.0 | 2.0 | 2.5 | 2.5 | — | — | 4 |
| 45 | 1.0 | 0.50 | — | 0.30 | — | — | 6 |

Run Nos. 27–30 were comparative experiments containing neither cadmium nor tellurium but incorporating Pb, Tl, Ge, and Hg only. Run Nos. 31–34, which incorporated cadmium and tellurium in amounts corresponding to the respective lower limits according to the invention and further incorporated Pb, Tl, Ge and Hg, each in an amount of 0.01%, showed fairly better results than Run No. 5 of Example 1 which incorporated none of the auxiliary components. Run Nos. 35–41 were working examples incorporating cadmium and tellurium, and either Pb or other auxiliary components in slightly greater amounts. Compared with the results of Run No. 7, those of Run Nos. 37–41 clearly indicate the conspicuous effects of the addition of Pb, Tl, Ge and Hg. Run Nos. 42–45 were working examples incorporating cadmium and tellurium, and either Pb or other auxiliary components in slightly larger amounts and, consequently, involving very low gassing rate.

EXAMPLE 3

Divalent silver oxide synthesized in the same manner as indicated in Example 1 was washed with water. In water, the washed divalent silver oxide and cadmium, tellurium, lead and germanium added thereto in the varying amounts indicated in Table 3 were stirred. The resultant mixture was filtered and dried. Separately, in an aqueous 40% (weight) potassium hydroxide solution, cadmium, tellurium, thallium and mercury were contained in the varying amounts indicated in Table 3, to produce an electrolyte. The dry mixture obtained above was allowed to stand in the electrolyte at 40° C. for 240 hours. The volume of gas evolved during the 240-hour standing was measured. The divalent silver oxide and the alkaline electrolyte were assayed for content of additive components. The additive components used in this case were in the form of CdO, TeO$_2$, PbO, GeO$_2$, Tl$_2$O$_3$ and HgO. The results were as shown in Table 3.

TABLE 3

| Run No. | Content in divalent silver oxide (% by weight) | | | | | | Content in potassium hydroxide (g/liter) | | | | | | Gassing rate ($\mu$l/g. 240 hours) |
|---|---|---|---|---|---|---|---|---|---|---|---|---|---|
| | Cd | Te | Tl | Hg | Pb | Ge | Cd | Te | Tl | Hg | Pb | Ge | |
| 46 | 0.3 | 0.1 | — | — | — | — | — | — | 0.1 | — | 0.1 | — | 15 |
| 47 | — | 0.1 | — | — | 0.1 | — | 0.3 | — | — | 0.1 | — | 0.1 | 20 |
| 48 | 0.3 | 0.1 | 0.1 | — | — | — | 0.3 | — | 0.1 | — | 0.1 | — | 8 |
| 49 | — | 0.1 | — | 0.05 | 0.05 | — | 0.3 | — | 0.1 | — | — | 0.1 | 21 |
| 50 | 0.3 | — | — | — | — | — | — | 0.1 | — | 0.1 | — | — | 17 |
| 51 | — | — | — | — | 0.05 | 0.05 | 0.3 | 0.1 | 0.1 | — | — | — | 19 |
| 52 | 0.3 | — | — | 0.1 | — | — | 0.3 | 0.1 | 0.1 | — | — | — | 15 |
| 53 | 0.3 | 0.1 | — | 0.05 | — | 0.05 | 0.3 | 0.1 | — | 0.1 | — | — | 13 |
| 54 | — | 0.1 | 0.1 | — | — | — | 0.3 | 0.1 | — | — | — | — | 20 |
| 55 | — | 0.1 | — | — | — | 0.1 | 0.3 | 0.1 | 0.1 | 0.1 | — | — | 18 |
| 56 | 0.3 | 0.1 | 0.1 | — | — | — | — | 0.1 | — | — | — | — | 9 |
| 57 | 0.3 | 0.1 | — | 0.05 | — | 0.05 | — | 0.1 | 0.05 | 0.05 | 0.05 | 0.05 | 16 |

In the test runs, cadmium and tellurium were used in their respectively fixed amounts, namely 0.3% by weight and 0.1% by weight for addition to the divalent silver oxide and 0.3 g/liter and 0.1 g/liter for addition to the electrolyte, while the Tl, Hg, Pb and Ge components were used in amounts of varying combinations. Good results were obtained invariably in all the test runs. The results indicate that these components are equally effective whether they are added to the divalent silver oxide or to the electrolyte.

EXAMPLE 4

Divalent silver oxide synthesized in the same manner as indicated in Example 1 was washed with water. In water, the washed divalent silver oxide and Y$_2$O$_3$, SnO$_2$, WO$_3$, La$_2$O$_3$, CeO$_2$, Sm$_2$O$_3$ and ZnO used in the form of aqueous dispersion as sources of yttrium, tin, tungsten, lanthanum, cerium, samarium and zinc and added thereto in the varying amounts indicated in Table 4 were stirred for 10 minutes. The mixture obtained was then filtered and dried. The dry mixture was tested for stability in an aqueous 40% (weight) potassium hydroxide solution at 40° C. or 240 hours. The volume of gas evolves during the standing was measured. The divalent silver oxide was assayed for content of additive components. The results were as shown in Table 4.

TABLE 4

| Run No. | Content in divalent silver oxide (% by weight) | | | | | | | | | Gassing rate ($\mu$l/g 240 hours) |
|---|---|---|---|---|---|---|---|---|---|---|
| | Cd | Te | Y | Sn | W | La | Ce | Sm | Zn | |
| 58 | — | — | 0.50 | — | — | — | — | — | — | 379 |
| 59 | — | — | — | 0.50 | — | — | — | — | — | 351 |
| 60 | — | — | — | — | — | — | 0.50 | — | — | 480 |
| 61 | — | — | — | — | — | — | — | — | 0.50 | 317 |
| 62 | 0.03 | 0.01 | 0.01 | — | — | — | — | — | — | 153 |
| 63 | 0.03 | 0.01 | — | 0.01 | — | — | — | — | — | 165 |
| 64 | 0.03 | 0.01 | — | — | 0.01 | — | — | — | — | 177 |
| 65 | 0.03 | 0.01 | — | — | — | — | — | 0.005 | 0.005 | 175 |
| 66 | 0.10 | 0.05 | — | — | — | 0.05 | — | — | — | 50 |
| 67 | 0.10 | 0.05 | — | — | — | — | 0.05 | — | — | 56 |
| 68 | 0.10 | 0.05 | — | — | — | — | — | — | 0.05 | 61 |
| 69 | 0.30 | 0.10 | 0.10 | — | — | — | — | — | — | 15 |
| 70 | 0.30 | 0.10 | — | 0.10 | — | — | — | — | — | 26 |
| 71 | 0.30 | 0.10 | — | — | — | 0.05 | — | — | 0.05 | 22 |
| 72 | 0.30 | 0.10 | — | — | — | — | — | 0.10 | — | 14 |
| 73 | 1.0 | 0.50 | — | — | — | — | 0.30 | — | — | 7 |
| 74 | 3.0 | 1.0 | 0.50 | 0.50 | — | — | — | 0.50 | — | 6 |
| 75 | 5.0 | 2.0 | — | 1.0 | — | 1.0 | — | — | — | 5 |
| 76 | 10.0 | 3.0 | — | 3.0 | — | 3.0 | — | — | — | 5 |

Run Nos. 58–61 were comparative experiments in which neither cadmium nor tellurium was used but Y, Sn, Ce and Zn were incorporated independently. Run Nos. 62–65, which incorporated cadmium and tellurium in amounts corresponding to their respective lower limits according to the invention and further incorporated, Y, Sn, W, and so on each in an amount of about 0.01%, showed conspicuously better results than Run No. 5 of Example 1 which incorporated none of other selected components such as Y and Sn. Run Nos. 66–72 were working examples incorporating cadmium and tellurium and yttrium and other auxiliary components in slightly greater amounts. Compared with the results of Run No. 7, those of Run Nos. 69–72 clearly indicate the conspicuous effects of the addition of Y, Sn, La, etc. Run Nos. 73–76 were working examples incorporating cadmium and tellurium and other auxiliary components in still larger amounts. The results of these test runs indicate that excess incorporation of such components do not bring about any additional improvement.

EXAMPLE 5

Divalent silver oxide was synthesized by the reaction of silver nitrate with potassium persulfate in an alkali solution. In the synthesis, a silver nitrate solution used as the raw material was weakly acidified with nitric acid. In this solution, cadmium and tellurium were added in the form of oxides in the varying amounts indicated in Table 5 and a varying member (none in one test run) of the group of auxiliary components, i.e., yttrium, tin, tungsten and samarium, added in the form of oxides in the varying amounts also indicated in Table 5, were dissolved or dispersed. The resultant solution or dispersion was put to use in the synthesis of divalent silver oxide. The divalent silver oxide specimens obtained in the various runs were tested for gassing rate. The results were as shown in Table 5.

TABLE 5

| Run No. | Content in divalent silver oxide (% by weight) | | | | | | Gassing rate ($\mu$l/g 240 hours) |
|---|---|---|---|---|---|---|---|
| | Cd | Te | Y | Sn | W | Sm | |
| 77 | 0.28 | 0.12 | — | — | — | — | 67 |
| 78 | 0.32 | 0.10 | 0.12 | — | — | — | 14 |
| 79 | 0.20 | 0.10 | — | 0.09 | — | — | 24 |
| 80 | 0.30 | 0.11 | — | — | 0.10 | — | 23 |
| 81 | 0.32 | 0.12 | — | — | — | 0.13 | 17 |

It is noted from the data of this table that whether cadmium and tellurium are incorporated after the formation of divalent silver oxide or they are incorporated before the formation, the results are almost the same as those obtained in Run Nos. 69–72 of Table 4.

When the test for gassing rate was performed by causing the speciments to stand in an aqueous 40% sodium hydroxide solution at 40° C. for 240 hours, the results were substantially the same as those shown in the table above.

EXAMPLE 6

In 1000 ml of deionized water, 100 g of dry divalent silver oxide synthesized in the same manner as indicated in Example 1 was thoroughly dispersed by stirring. In the resultant dispersion, Cd(OH)$_2$ as a source of cadmium, powdered tellurium metal as a source of tellurium, and auxiliary components including Y$_2$O$_3$ and Al$_2$O$_3$ as sources, respectively, of yttrium and aluminum, and powdered tin metal and selenium metal as sources of tin and selenium were added in the varying amounts indicated in Table 6 and thoroughly mixed. The resultant mixture was filtered and dried. Separately, in an aqueous 40% (weight) potassium hydroxide solution intended as an electrolyte in a cell, CdO, TeO$_2$, Y$_2$O$_3$, Al$_2$O$_3$, SeO$_2$, La$_2$O$_3$, ZnO and SnO$_2$ were added in the varying amounts indicated in Table 6. In the resultant alkali solution, the aforementioned dry mixture was allowed to stand for 240 hours and tested for gassing rate. The results were as shown in Table 6.

TABLE 6

| Run No. | Content in divalent silver oxide (% by weight) Cd | Te | | | | Content in potassium hydroxide (g/liter) Cd | Te | | | | Gassing rate ($\mu$l/g. 240 hours) |
|---|---|---|---|---|---|---|---|---|---|---|---|
| 82 | 0.3 | 0.1 | — | — | — | — | — | Y 0.01 | — | — | 45 |
| 83 | 0.3 | 0.1 | — | — | — | — | — | — | Al 0.01 | — | 53 |
| 84 | 0.3 | 0.1 | — | — | — | — | — | — | Al 0.05 | Se 0.05 | 48 |
| 85 | 0.3 | 0.1 | — | — | — | — | — | La 0.005 | Zn 0.005 | Sn 0.005 | 44 |
| 86 | 0.3 | 0.1 | — | — | — | — | — | Y 1.0 | — | — | 15 |
| 87 | 0.3 | 0.1 | — | — | — | — | — | — | La 0.5 | Sn 0.5 | 20 |
| 88 | — | — | Y 0.3 | Al 0.1 | — | 0.5 | 0.5 | — | — | — | 13 |
| 89 | — | 0.1 | — | — | La 0.1 | 0.5 | — | Se 0.1 | — | — | 19 |
| 90 | — | — | — | — | — | 0.5 | 0.1 | — | — | — | 70 |
| 91 | — | — | Y 0.01 | — | — | 0.5 | 0.1 | — | — | — | 49 |
| 92 | — | — | Sn 0.005 | Se 0.005 | Al 0.005 | 0.5 | 0.1 | — | — | — | 50 |
| 93 | — | 0.1 | Y 0.3 | — | — | — | — | — | — | — | 278 |
| 94 | — | 0.1 | Y 0.3 | — | — | 0.01 | — | — | — | — | 175 |
| 95 | — | 0.1 | Y 0.3 | — | — | 0.05 | — | — | — | — | 90 |
| 96 | 0.3 | — | — | Sn 0.1 | — | — | — | — | — | — | 251 |
| 97 | 0.3 | — | — | Sn 0.1 | — | — | 0.01 | — | — | — | 163 |
| 98 | 0.3 | — | — | Sn 0.1 | — | — | 0.04 | — | — | — | 87 |

From the data given in Table 6, it is seen that when cadmium and tellurium are added to the divalent silver oxide, and yttrium and other auxiliary components are added to the electrolyte as in Run Nos. 82–85 and Run Nos. 86 and 87, better results are obtained than when the addition of auxiliary components is omitted as in Run No. 4, and that when such auxiliary components are added in greater amounts as in Run Nos. 86 and 87, the stability is still better. Run Nos. 88–89 were working examples incorporating cadmium in the electrolyte and adding tellurium to either the electrolyte or the divalent silver oxide and Run No. 90 was comparative experiment omitting incorporation of auxiliary components. Comparision of their results clearly shows that the working examples conforming to the present invention provide better results than the comparative experiment. Run Nos. 93–95 and Run Nos. 96–98 were working examples incorporating cadmium or tellurium in amounts corresponding to their respective lower limits according to the invention. In Run Nos. 93–95, tellurium and yttrium were added in equal amounts. Run No. 93 incorporated no cadmium, while Run No. 94 incorporated cadmium in a concentration of 0.01 g/liter. Comparison of their results indicates that the addition of cadmium already manifests its effect even when the amount of cadmium added is very small. In Run Nos. 96–98, cadmium and tin were added in equal amounts. Run No. 96 incorporated no tellurium, while Run No. 97 incorporated tellurium in a concentration of 0.01 g/liter. Comparison of their results indicates that the addition of tellurium manifests its effect when the amount of tellurium added is very small. In the test runs indicated above, the electrolyte used was potassium hydroxide. When the runs were repeated with sodium hydroxide, the results were substantially similar.

EXAMPLE 7

In 1000 ml of deionized water, 100 g of dry divalent silver oxide synthesized in the same manner as described in Example 1 was thoroughly dispersed by stirring. In the resultant dispersion, a varying cadmium source was added in a varying amount indicated in Table 7 and was thoroughly mixed. The resultant mixture was filtered and dried. In an electrolyte which was an aqueous potassium hydroxide solution in some runs and an aqueous sodium hydroxide solution in other runs, a varying tellurium source was added in the varying amount indicated in Table 7, to determining the gassing rate. The results were as shown in Table 7.

TABLE 7

| Run No. | Cd source for addition to AgO | Cd content (% by weight) in AgO | Te source for addition to electrolyte | Te content in alkali (g/liter) | Kind of alkali solution | Gassing rate ($\mu$l/g 240 hours) |
|---|---|---|---|---|---|---|
| 99 | Cd(OH)$_2$ | 0.30 | H$_6$TeO$_6$ | 0.20 | KOH | 76 |
| 100 | Metallic Cd power | " | Na$_2$TeO$_3$ | 0.20 | " | 85 |
| 101 | CdS | " | Metallic Te powder | 0.10 | " | 100 |
| 102 | Cd(NO$_3$)$_2$ | " | TeO$_2$ | 0.05 | " | 150 |
| 103 | CdO | " | H$_6$TeO$_6$ | 0.10 | NaOH | 83 |
| 104 | Cd(OH)$_2$ | " | TeO$_2$ | 0.10 | " | 75 |

Run No. 99–104 were working examples using various cadmium sources and various tellurium sources. The data of the table given above indicate that the results are substantially the same, although they vary slightly with the kind of cadmium and tellurium sources used.

EXAMPLE 8

Divalent silver oxide synthesized in the same manner as indicated in Example 1 was washed with water. In water, the washed divalent silver oxide and Cd, Te, Tl, Pb, Y and Sn components added thereto in the varying amounts indicated in Table 8 were stirred. The resultant mixture was filtered and dried. The dried divalent silver oxide specimen thus obtained was molded in a tablet machine under a pressure of 4 tons/cm$^2$ to produce tablets weighing 0.5 g each and measuring 10 mm in diameter. The tablets had a thickness of about 1 mm. Separately, in an aqueous 40% (weight) potassium hydroxide solution intended as an electrolyte in a cell, Cd(OH)$_2$, sodium tellurate, Tl$_2$O$_3$, PbO, Y$_2$O$_3$ and SnO$_2$ were added in amounts calculated to give the varying concentrations indicated in Table 8. In the resultant alkali solution, the aforementioned tables were allowed to stand for 240 hours and tested for gassing rate. In the test device, the tablets were placed lest any one of them should fall on top of another. The results were as shown in Table 8.

TABLE 8

| Run No. | Content in divalent silver oxide (% by weight) | | | | | Content in potassium hydroxide (g/liter) | | | | | Gassing rate ($\mu$l/g 240 hours) |
|---|---|---|---|---|---|---|---|---|---|---|---|
| | Cd | Te | Tl | | | Cd | Te | Tl | | | |
| 105 | — | — | — | — | — | — | — | — | — | — | 930 |
| 106 | 0.3 | 0.1 | — | | | | | | | | 123 |
| 107 | 0.3 | 0.1 | 0.1 | | | | | | | | 47 |
| 108 | 0.3 | 0.1 | 0.1 | — | — | 0.5 | 0.2 | — | Pb 0.5 | Sn | 38 |
| 109 | 2.0 | 0.5 | — | Y 0.5 | Sn 0.5 | 0.5 | 0.2 | 0.5 | Pb 0.5 | | 18 |
| 110 | — | — | — | — | — | 0.5 | 0.2 | — | — | | 158 |
| 111 | — | — | — | — | — | 0.5 | 0.2 | 0.5 | Y 0.5 | — | 67 |
| 112 | 0.3 | — | — | Sn 0.1 | | — | 0.2 | 0.5 | — | — | 42 |
| 113 | 5.0 | 1.0 | 1.0 | — | — | 5.0 | 1.0 | | Y 1.0 | | 14 |
| 114 | 10.0 | 2.0 | 2.0 | | | 10.0 | 2.0 | 2.0 | | | 12 |

Generally, the material for the positive electrode is molded into tablets under a pressure of the order of 4 tons/cm$^2$ and, in the form of tablets, set in position in a cell. In this example, therefore, the divalent silver oxide specimens were tested for gassing rate under conditions approximating those of the reaction proceeding within the actual cell. Run No. 105 was comparative experiment which omitted incorporation of additive components. Since the crystals of the divalent silver oxide were exposed to stress during the molding, the gassing rate obtained in this test run was higher than in Run No. 1 using powdered divalent silver oxide. Run No. 106 was an example incorporating cadmium and tellurium only, while Run No. 107 incorporated thallium in addition to cadmium and tellurium. In both these test runs, higher gassing rate were registered than when the same specimens were subjected to the test in their loose powdered form, owing to the effect of stress. Nevertheless, their results clearly indicate a conspicuous effect of the incorporation of additive components, in contrast to the results of Run No. 105. Run Nos. 108 and 109 were working examples in which the number of additive components and their amounts were increased. In these test runs, the gassing rates were consequently lowered. Run Nos. 110 and 111 were working examples in which the additive components were incorporated solely in the electrolyte. The results of these test runs were similar to those obtained in test runs in which the additive components were incorporated in the divalent silver oxide. Run Nos. 113 and 114 were working examples using additive components in larger amounts. Their results indicate that excess addition of these components brings about no discernible improvement in the effect of their addition.

We claim:

1. In a divalent silver oxide cell containing an alkaline electrolyte and having a positive electrode formed mainly of divalent silver oxide, the improvement wherein a cadmium component and a tellurium component are contained in at least one of the divalent silver oxide and the alkaline electrolyte.

2. The divalent silver oxide cell according to claim 1, wherein said cadmium component is contained in said divalent silver oxide in a concentration of not less than 0.03% by weight.

3. The divalent silver oxide cell according to claim 1, wherein said cadmium component is contained in said alkaline electrolyte in a concentration of not less than 0.03 g/liter.

4. The divalent silver oxide cell according to claim 1, wherein said cadmium component is contained in said divalent silver oxide in a concentration of not less than 0.01% by weight and in said alkaline electrolyte in a concentration of not less than 0.02 g/liter.

5. The divalent silver oxide cell according to claim 1, wherein said tellurium component is contained in said divalent silver oxide in a concentration of not less than 0.01% by weight.

6. The divalent silver oxide cell according to claim 1, wherein said tellurium component is contained in said alkaline electrolyte in a concentration of not less than 0.02 g/liter.

7. The divalent silver oxide cell according to claim 1, wherein said tellurium component is contained in said divalent silver oxide in a concentration of not less than 0.01% by weight and in said alkaline electrolyte in a concentration of not less than 0.02 g/liter.

8. The divalent silver oxide cell according to claim 1, wherein said cadmium component has been added in a suspended state to said alkaline electrolyte.

9. The divalent silver oxide cell according to claim 8, wherein said cadmium component, when added to the alkaline electrolyte, has a particle size of not larger than 60 mesh.

10. The divalent silver oxide cell according to claim 1, wherein the incorporation of said cadium component and said tellurium component in said divalent silver oxide is accomplished by producing a divalent silver oxide slurry by the reaction of an alkali hydroxide, silver nitrate and an oxidizing agent, adding said components to said slurry and mixing them therein.

11. The divalent silver oxide cell according to claim 1, wherein the incorporation of said cadmium component and said tellurium component in said divalent silver oxide is accomplished by producing divalent silver oxide by the reaction of an alkali hydroxide, silver nitrate and an oxidizing agent, drying said divalent silver oxide, redispersing the dried divalent silver oxide in a dispersion medium and subsequently adding said components to the resultant dispersion.

12. The divalent silver oxide cell according to claim 1, wherein the incorporation of said cadmium component and said tellurium component in said divalent silver oxide is accomplished by producing divalent silver oxide by the reaction of an alkali hydroxide, silver nitrate and an oxidizing agent, drying the produced divalent silver oxide and subsequently mixing said components with the dried divalent silver oxide mechanically.

13. The divalent silver oxide cell according to claim 1, wherein the reaction for the formation of divalent silver oxide by use of silver nitrate solution, an alkali solution, an oxidizing agent and water is carried out with said cadmium component and said tellurium component incorporated in the raw materials for the formation of divalent silver oxide.

14. The divalent silveroxide cell according to claim 1, wherein said cadmium component and said tellurium component, when contained in said divalent silver oxide, are contained therein the amounts such that the ratio of cadmium to tellurium is not less than 0.2.

15. The divalent silver oxide cell according to claim 14, wherein said ratio is over 0.5.

16. The divalent silver oxide cell according to claim 15, wherein said cadmium component is contained in a concentration within the range of from 0.03 to 10 g/liter and said tellurium in a concentration within the range of from 0.04 to 5.0 g/liter.

17. The divalent silver oxide cell according to claim 1, wherein the total of the amount of cadmium component and tellurium component contained in said divalent silver oxide is not more than 10% by weight.

18. The divalent silver oxide cell according to claim 1, wherein said cadmium component is at least one member selected from the group consisting of cadmium oxide, cadmium hydroxide, powdered cadmium metal, cadmium sulfide, cadmium sulfate, cadmium nitrate, cadmium stearate, cadmium formate and cadmium selenide.

19. The divalent silver oxide cell according to claim 1, wherein said tellurium component is at least one member selected from the group consisting of tellurium dioxide, tellurium trioxide, powdered tellurium metal, telluric acid, tellurous acid, alkali salts of telluric acid and alkali salts of tellurous acid.

20. The divalent silver oxide cell according to claim 1, wherein said cadmium component and said tellurium component, when contained in said alkaline electrolyte, are contained therein in respective concentrations of not less than 0.03 g/liter and not less than 0.01 g/liter.

21. In a divalent silver oxide cell containing an alkaline electrolyte and having a positive electrode formed mainly of divalent silver oxide, the improvement wherein a cadmium component and a tellurium component and at least one auxiliary component selected from the group consisting of thallium, mercury, lead, germanium, yttrium, tin, tungsten, lanthanum, rare earth elements, zinc, aluminum and selenium are contained in at least one of the divalent silver oxide and the alkaline electrolyte.

22. The divalent silver oxide cell according to claim 21, wherein said cadmium component is contained in said divalent silver oxide in a concentration of not less than 0.03% by weight.

23. The divalent silver oxide cell according to claim 21, wherein said cadmium component is contained in said alkaline electrolyte in a concentration of not less than 0.01 g/liter.

24. The divalent silver oxide cell according to claim 21, wherein said cadmium component is contained in said divalent silver oxide in a concentration of not less than 0.03% by weight and in said alkaline electrolyte in a concentration of not less than 0.01 g/liter.

25. The divalent silver oxide cell according to claim 21, wherein said tellurium component is contained in said divalent silver oxide in a concentration of not less than 0.01% by weight.

26. The divalent silver oxide cell according to claim 21, wherein said tellurium component is contained in said alkaline electrolyte in a concentration of not less than 0.01 g/liter.

27. The divalent silver oxide cell according to claim 21, wherein said tellurium component is contained in said divalent silver oxide in a concentration of not less than 0.01% by weight and in said alkaline electrolyte in a concentration of not less than 0.01 g/liter.

28. The divalent silver oxide cell according to claim 21, wherein said at least one auxiliary component is contained in said divalent silver oxide in a concentration of not less than 0.01% by weight.

29. The divalent silver oxide cell according to claim 21, wherein said at least one auxiliary component is contained in said alkaline electrolyte in a concentration of not less than 0.01 g/liter.

30. The divalent silver oxide cell according to claim 21, wherein said at least one auxiliary component is contained in said divalent silver oxide in a concentration of not less than 0.01% by weight and in said alkaline electrolyte in a concentration of not less than 0.01 g/liter.

31. The divalent silver oxide cell according to claim 21, wherein the total of the amount of cadmium component, tellurium component and at least one auxiliary component contained in said divalent silver oxide is not more than 10% by weight.

32. The divalent silver oxide cell according to claim 21, wherein said cadmium component and said at least one auxiliary component containing an element selected from the group consisting of thallium, mercury, tin and yttrium are added in a suspended state to said alkaline electrolyte.

33. The divalent silver oxide cell according to claim 21, wherein the incorporation of said cadmium component, said tellurium component and said at least one auxiliary component in said divalent silver oxide is accomplished by producing a divalent silver oxide slurry by the reaction of an alkali hydroxide, silver nitrate and an oxidizing agent, adding said components to said slurry and mixing them therein.

34. The divalent silver oxide cell according to claim 33, wherein said cadmium component and said at least one auxiliary component, when added to the alkaline electrolyte, have a particle size of not larger than 60 mesh.

35. The divalent silver oxide cell according to claim 21, wherein the incorporation of said cadmium component, said tellurium component and said at least one auxiliary component in said divalent silver oxide is accomplished by producing divalent silver oxide by the reaction of an alkali hydroxide, silver nitrate and an oxidizing agent, drying said divalent silver oxide, redispersing the dried divalent silver oxide in a dispersion medium and subsequently adding said components to the resultant dispersion.

36. The divalent silveroxide cell according to claim 21, wherein the incorporation of said cadmium component, said tellurium component and said at least one auxiliary component in said divalent silver oxide is accomplished by producing divalent silver oxide by the reaction of an alkali hydroxide, silver nitrate and an oxidizing agent, drying the produced divalent silver oxide and subsequently mixing said components with the dried divalent silver oxide mechanically.

37. The divalent silver oxide cell according to claim 21, wherein the reaction for the formation of divalent silver oxide by use of silver nitrate solution, and alkali solution, an oxidizing agent and water is carried out with said cadmium component, said tellurium component and said at least one auxiliary component incorporated in the raw materials for the formation of divalent silver oxide.

38. The divalent silver oxide cell according to claim 21, wherein said cadmium component is at least one member selected from the group consisting of cadmium oxide, cadmium hydroxide, powdered cadmium metal, cadmium sulfide, cadmium sulfate, cadmium nitrate, cadmium stearate, cadmium formate and cadmium selenide.

39. The divalent silver oxide cell according to claim 21, wherein said tellurium component is at least one member selected from the group consisting of tellurium dioxide, tellurium trioxide, powdered tellurium metal, telluric acid, tellurous acid, alkali salts of telluric acid and alkali salts of tellurous acid.

* * * * *